(12) United States Patent
Beagen (10) Patent No.: US 10,981,189 B2
(45) Date of Patent: Apr. 20, 2021

(54) HANGING CONNECTOR FOR FLEXIBLE SPRINKLER CONDUIT

(71) Applicant: Anvil International, LLC, Exeter, NH (US)

(72) Inventor: Joseph Beagen, Providence, RI (US)

(73) Assignee: Anvil International, LLC, Exeter, NH (US)

( * ) Notice: Subject to any disclaimer, the term of this patent is extended or adjusted under 35 U.S.C. 154(b) by 71 days.

(21) Appl. No.: 15/644,141

(22) Filed: Jul. 7, 2017

(65) Prior Publication Data

US 2019/0009295 A1 Jan. 10, 2019

(51) Int. Cl.
*B05B 15/62* (2018.01)
*B05B 1/06* (2006.01)
*A62C 35/68* (2006.01)
*A62C 37/11* (2006.01)

(52) U.S. Cl.
CPC .............. *B05B 15/62* (2018.02); *A62C 35/68* (2013.01); *B05B 1/06* (2013.01); *A62C 37/11* (2013.01)

(58) Field of Classification Search
CPC ......... B05B 1/06; B05B 15/62; B05B 15/061; F16L 3/00; F16L 3/133; F16L 15/08; F16L 3/14; F16L 3/26; A62C 35/68
USPC ....... 285/61, 64; 248/65–74.5, 75–93, 58–64
See application file for complete search history.

(56) References Cited

U.S. PATENT DOCUMENTS

| | | | | | |
|---|---|---|---|---|---|
| 884,661 | A | * | 4/1908 | Howe | F16L 3/26 248/49 |
| 1,052,837 | A | * | 2/1913 | Makutchan | F16C 23/02 384/258 |
| 1,760,224 | A | * | 5/1930 | Wray | E21B 21/02 285/281 |
| 1,838,623 | A | * | 12/1931 | Hersey, Jr. | E21F 17/02 138/107 |
| 2,246,557 | A | * | 6/1941 | Walters | H02G 5/025 174/84 S |
| D152,275 | S | | 1/1949 | Ludwig | |
| 2,698,760 | A | * | 1/1955 | Roth | F16L 27/0861 137/799 |

(Continued)

FOREIGN PATENT DOCUMENTS

| | | | | |
|---|---|---|---|---|
| CA | 2921391 A1 | * | 2/2015 | ............. F16L 3/006 |
| JP | 2000317008 | | 11/2000 | |
| WO | 2019010319 | | 1/2019 | |

OTHER PUBLICATIONS

Beagen, Joseph; International Search Report for PCT Application No. PCT/US18/40938, filed Jul. 5, 2018, dated Oct. 1, 2018, 11 pgs.

(Continued)

*Primary Examiner* — Viet Le
*Assistant Examiner* — Steven M Cernoch
(74) *Attorney, Agent, or Firm* — Taylor English Duma LLP (57) ABSTRACT

Provided herein is a fire protection sprinkler system including a hanging connector joining together a plurality of flexible conduits. In one approach a sprinkler assembly includes a sprinkler body coupled to a first flexible conduit, and a hanging connector coupled to the first flexible conduit and to a second flexible conduit, wherein the hanging connector includes a hanging member extending outwardly from the hanging connector. The sprinkler assembly further includes a metallic connector extending between the hanging member and a support structure.

24 Claims, 8 Drawing Sheets

(56) References Cited

U.S. PATENT DOCUMENTS

| | | | | |
|---|---|---|---|---|
| 3,194,590 A * | 7/1965 | Cook | F16L 3/133 | 248/62 |
| 3,244,388 A * | 4/1966 | Coffman | F16L 3/14 | 138/107 |
| 3,414,220 A * | 12/1968 | Walker | F16L 3/2235 | 248/68.1 |
| 3,539,139 A * | 11/1970 | Eucker | F16L 3/14 | 174/40 R |
| 3,838,712 A * | 10/1974 | Courtney | F16L 3/00 | 138/103 |
| 3,960,350 A * | 6/1976 | Tardoskegyi | F16L 3/14 | 248/589 |
| 4,793,578 A * | 12/1988 | Howard | F16L 3/222 | 248/62 |
| 4,834,186 A * | 5/1989 | Ballard | A62C 37/09 | 169/16 |
| D332,481 S | 1/1993 | Petty et al. | | |
| 5,209,440 A * | 5/1993 | Walker | F16L 5/14 | 248/68.1 |
| 5,226,456 A * | 7/1993 | Semak | F16L 3/26 | 138/107 |
| 5,344,108 A * | 9/1994 | Heath | F16L 3/14 | 248/300 |
| 5,474,274 A * | 12/1995 | Bernosky | E21F 17/02 | 248/317 |
| 5,702,077 A * | 12/1997 | Heath | F16L 3/14 | 248/59 |
| D397,413 S | 8/1998 | Sapp | | |
| 6,086,029 A * | 7/2000 | Oliver | E04B 5/12 | 248/200.1 |
| 6,135,397 A * | 10/2000 | Santa Cruz | F16L 3/14 | 248/302 |
| 6,158,519 A | 12/2000 | Kretschmer | A62C 35/645 | 169/16 |
| 6,484,976 B1 * | 11/2002 | Boutin | B60K 17/24 | 180/379 |
| 6,488,097 B1 * | 12/2002 | MacDonald, III | A62C 35/68 | 169/16 |
| 6,655,641 B2 * | 12/2003 | Sherman | B61B 7/00 | 104/123 |
| 6,896,301 B2 * | 5/2005 | Brice | F16L 23/08 | 285/364 |
| D544,448 S | 6/2007 | Hull et al. | | |
| D554,237 S | 10/2007 | Lewis et al. | | |
| D594,938 S | 6/2009 | Dirneder | | |
| 7,735,786 B2 * | 6/2010 | Roberts | B66C 1/62 | 248/318 |
| 7,793,988 B1 | 9/2010 | Shemtov | | |
| D647,784 S | 11/2011 | McNamara | | |
| 8,056,938 B2 | 11/2011 | Shen et al. | | |
| D659,644 S | 5/2012 | Gretz | | |
| 8,875,743 B2 * | 11/2014 | Persaud | F16L 3/10 | 138/106 |
| 8,876,067 B2 * | 11/2014 | McAllister | F16L 41/12 | 239/283 |
| D724,699 S | 3/2015 | Wyne | | |
| 9,140,277 B2 * | 9/2015 | McMillen | E04B 9/0428 | |
| 9,375,594 B2 * | 6/2016 | Stempo | A62C 35/68 | |
| 9,464,749 B2 * | 10/2016 | Heath | E04H 9/02 | |
| D777,885 S | 1/2017 | Zhang et al. | | |
| D779,046 S | 2/2017 | Tansey, Jr. | | |
| D782,621 S | 3/2017 | Smith | | |
| D787,648 S | 5/2017 | Smith | | |
| 9,709,192 B1 * | 7/2017 | Newcomb | F16B 19/00 | |
| 9,951,821 B1 | 4/2018 | Franzino | | |
| 10,006,565 B2 * | 6/2018 | Kito | F16L 3/1016 | |
| D822,180 S | 7/2018 | Rolston | | |
| D832,222 S | 10/2018 | Johnson et al. | | |
| D854,915 S | 7/2019 | Beagen | | |
| D862,203 S | 10/2019 | Beagen | | |
| D872,563 S | 1/2020 | Beagen | | |
| 2002/0195817 A1 * | 12/2002 | Choi | A62C 35/68 | 285/45 |
| 2004/0094960 A1 * | 5/2004 | Brice | F16L 23/08 | 285/363 |
| 2005/0051674 A1 * | 3/2005 | Breeden, Jr. | F16L 3/14 | 248/68.1 |
| 2007/0205601 A1 | 9/2007 | Shemtov | | |
| 2008/0011908 A1 * | 1/2008 | Wilson | F16L 3/14 | 248/62 |
| 2009/0224533 A1 | 9/2009 | Richter | | |
| 2010/0038494 A1 * | 2/2010 | Osborn | F16L 3/1218 | 248/58 |
| 2011/0147538 A1 * | 6/2011 | Schiefelbein, Jr. | E21B 17/1035 | 248/60 |
| 2013/0233430 A1 | 9/2013 | Stempo et al. | | |
| 2014/0020777 A1 | 1/2014 | Kacik et al. | | |
| 2015/0048614 A1 | 2/2015 | Coyle, Jr. | | |
| 2015/0069750 A1 | 3/2015 | Jung | | |
| 2017/0082232 A1 * | 3/2017 | Bosis | F16L 3/14 | |
| 2017/0184222 A1 * | 6/2017 | Aker | F16L 3/1075 | |
| 2018/0099167 A1 | 4/2018 | Dafoneseca et al. | | |

OTHER PUBLICATIONS

Uponor-USA.com, "How an Uponor AquaSAFE Multipurpose System Works" [online], Mar. 24, 2016 (Mar. 24, 2016), retrieved from the Internet on Sep. 6, 2018) <URL https:l/www.uponor-usa.com/residential-fire-safety/builder/how-multipurpose-works.aspx>; 2 pgs.

Beagen, Joseph; Ex Parte Quayle Action for U.S. Appl. No. 29/625,298, filed Nov. 8, 2017, dated Oct. 2, 2018, 7 pgs.

Beagen, Joseph; Notice of Allowance for Design U.S. Appl. No. 29/625,298, filed Nov. 8, 2017, dated Dec. 7, 2018, 13 pgs.

Beagen, Joseph; Issue Notification for Design U.S. Appl. No. 29/625,298, filed Nov. 8, 2017, dated Apr. 10, 2019, 1 pg.

Beagen, Joseph; Notice of Allowance for U.S. Appl. No. 29/625,298, filed Nov. 8, 2017, dated Jun. 3, 2019, 14 pgs.

Beagen, Joseph; Notice of Allowance for U.S. Appl. No. 29/680,987, filed Feb. 21, 2019, dated May 21, 2019, 14 pgs.

Beagen, Joseph; Notice of Allowance for Design U.S. Appl. No. 29/701,865, filed Aug. 15, 2019, dated Nov. 25, 2019, 19 pgs.

Beagen, Joseph; International Preliminary Report on Patentability for PCT Application No. PCT/US18/40938, filed Jul. 5, 2018, dated Jan. 16, 2020, 10 pgs.

\* cited by examiner

HANGING CONNECTOR FOR FLEXIBLE SPRINKLER CONDUIT

BACKGROUND OF THE DISCLOSURE

Field of the Disclosure

The present disclosure relates to sprinkler assemblies and, more particularly, to a fire protection sprinkler system including a hanging connector joining together a plurality of flexible conduits.

Discussion of Related Art

In commercial buildings, air ducts, wiring, and other utilities, such as fire suppression conduits, are installed overhead and subsequently concealed by a suspended ceiling. Conduits for gas, water, steam and/or compressed air, electrical cable conduits, and other associated plumbing and/or utility carrying conduits are suspended from a ceiling or other support structures. Dropped ceiling construction requires reliable installation of electrical and other utility services above the ceiling. This is usually accomplished by means of suspension devices that are attachable to the support structure and adaptable for holding and supporting the conduit, usually in substantially horizontal positions. Commonly, electrical and fire suppression conduits are strung above the dropped ceiling through supporting channels.

The installation of fire suppression systems in building construction is subject to stringently enforced codes. Certain codes require that long runs of conduit be supported at some interval, depending on the type of conduit. For example, flexible metal conduits used to carry fire suppression fluid generally must be supported at least every 6 (six) feet. Accordingly, various devices to support the conduit(s) are hung or otherwise supported from some support structure, such as an upper ceiling, at regular intervals along the length of travel of the conduit(s).

Many prior art conduit support devices are complicated and cumbersome mechanisms that are inconvenient, awkward, and difficult to manufacture, handle and operate. These devices often require considerable assembly and manipulation to adequately secure the conduit in its supported position with a hanger assembly. The amount of labor required to form the parts and to assemble them into a conduit hanging system is often extensive. Another drawback with prior art hangers is that they often require assembly using tools or additional pieces, which may increase time and expense.

SUMMARY OF THE DISCLOSURE

In view of the foregoing, there is a need in the art for a hanging connector for flexible sprinkler conduits to alleviate the problems of conventional systems. Provided herein is a sprinkler assembly including flexible conduits joined end-to-end by a hanging connector, which satisfies applicable fire codes and standards.

One approach according to the disclosure includes a sprinkler assembly having a sprinkler body coupled to a first flexible conduit, and a hanging connector coupled to the first flexible conduit and to a second flexible conduit, wherein the hanging connector includes a hanging member extending outwardly from the hanging connector. The sprinkler assembly further includes a metallic connector extending between the hanging member and a support structure.

Another approach according to the disclosure includes a hanging connector having a body including a first side opposite a second side, and a first connection arm extending from the first side, and a second connection arm extending from the second side, wherein the first side and the second side are separated by a sidewall. The hanging connector further includes a hanging member extending outwardly from the sidewall, and a metallic connector extending between the hanging member and a support structure.

Yet another approach according to the disclosure includes a sprinkler assembly having a sprinkler body coupled at one end to a sprinkler head and at another end to a first flexible conduit, and a hanging connector coupled to the first flexible conduit and to a second flexible conduit. The hanging connector may include a first side, a second side opposite the first side, and a sidewall extending between the first and second sides. The hanging connector may further include a hanging member extending outwardly from the sidewall. The hanging connector may further include a first threaded connection arm extending from the first side and a second threaded connection arm extending from the second side, wherein the first flexible conduit is secured to the first threaded connection arm and the second flexible conduit is secured to the second threaded connection arm. The sprinkler assembly may further include a metallic connector extending between the hanging member and a support structure.

BRIEF DESCRIPTION OF THE DRAWINGS

The accompanying drawings illustrate approaches of the disclosure, including the practical application of the principles thereof, and in which.

The drawings are not necessarily to scale. The drawings are merely representations, not intended to portray specific parameters of the disclosure. Furthermore, the drawings are intended to depict embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, provided herein is a fire protection sprinkler system including a hanging connector joining together a plurality of flexible conduits. In one approach a sprinkler assembly includes a sprinkler body coupled to a first flexible conduit, and a hanging connector coupled to the first flexible conduit and to a second flexible conduit, wherein the hanging connector includes a hanging member extending outwardly from the hanging connector. The sprinkler assembly further includes a metallic connector extending between the hanging member and a support structure for suspending the flexible conduits above an interior ceiling, such as a drop ceiling or a top wall of a freezer/cooler. The sprinkler assembly satisfies applicable fire codes and standards.

Figure 1:
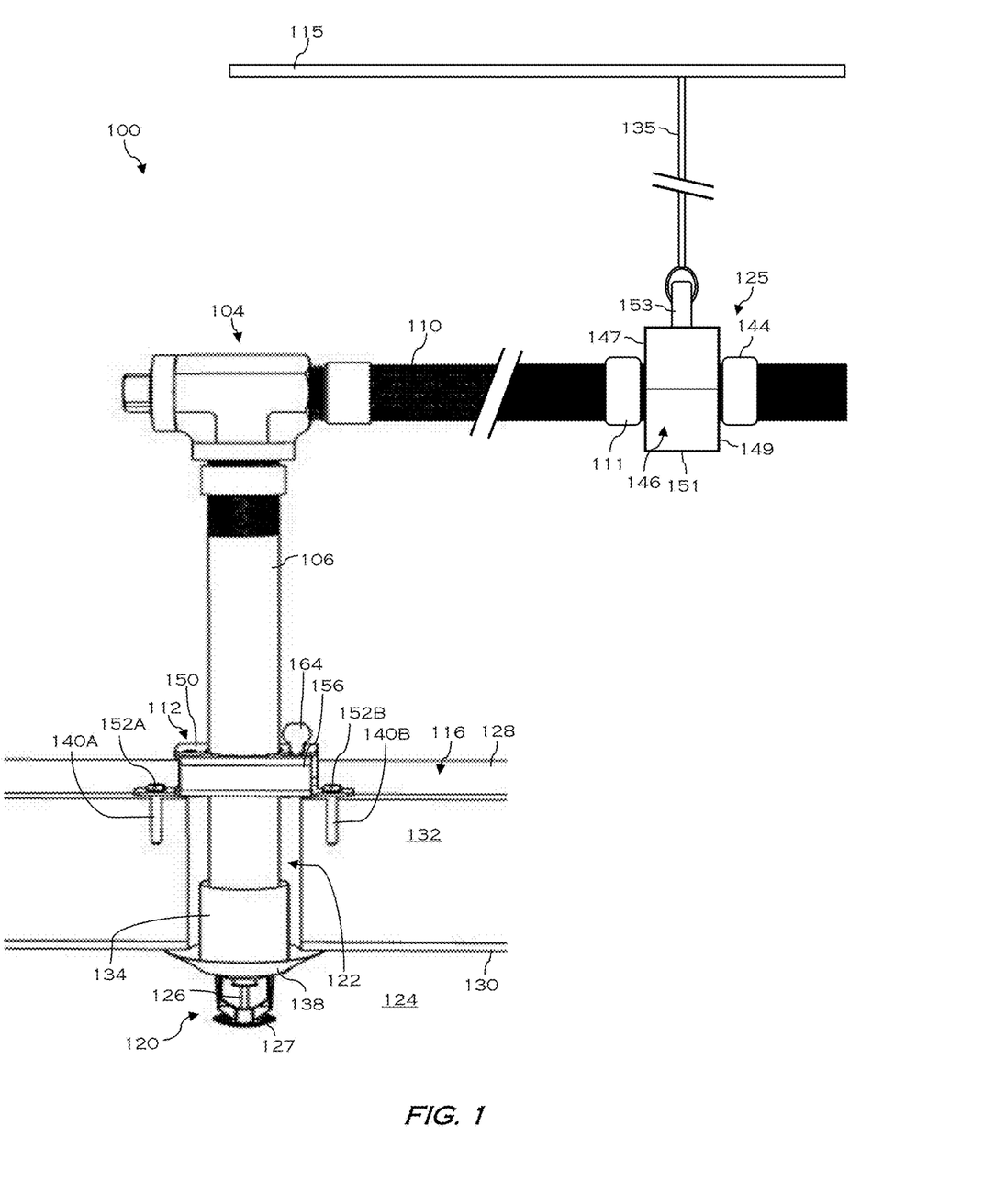
FIG. 1 is an isometric side view of a sprinkler assembly according to approaches of the disclosure.
Figure 2:
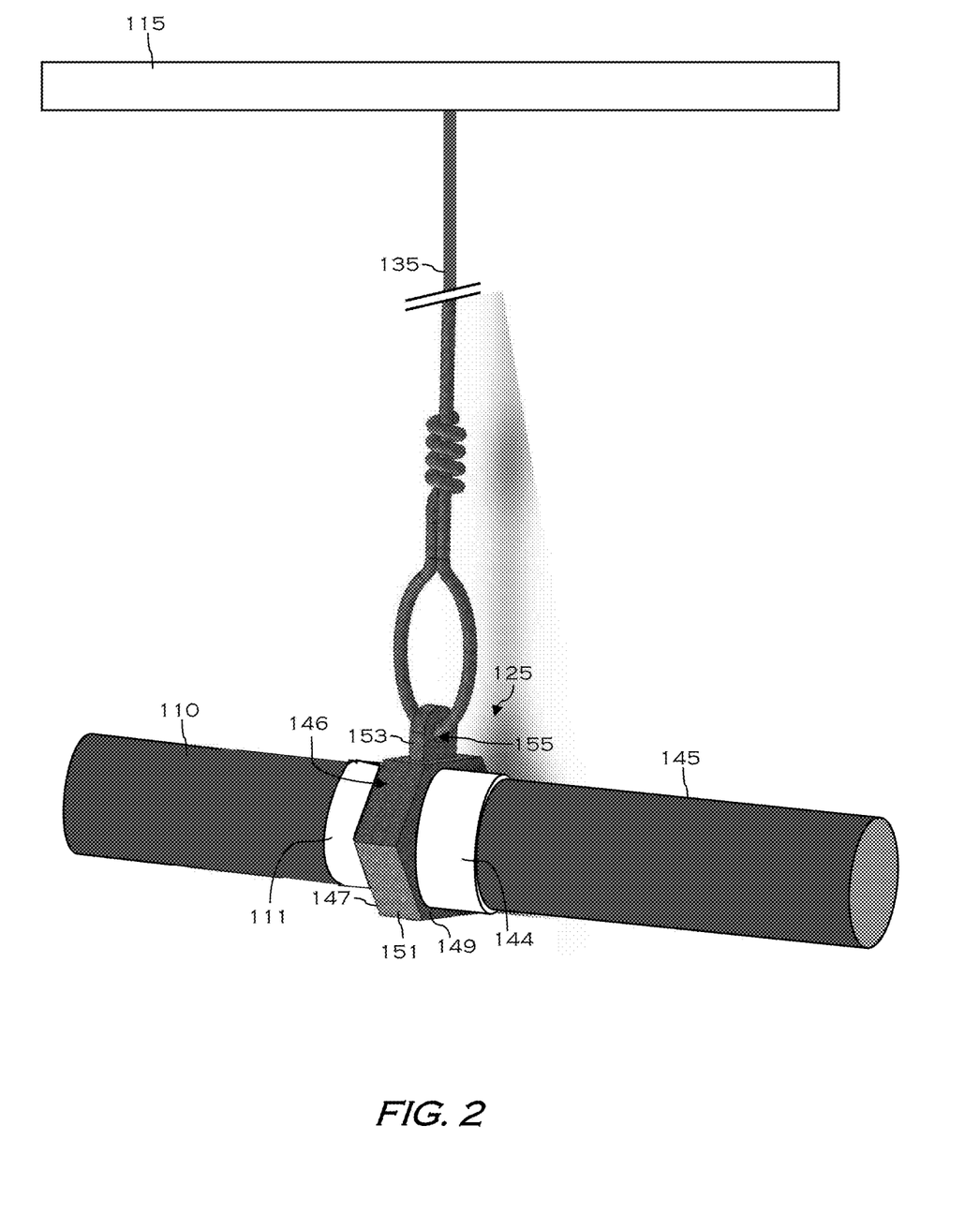
FIG. 2 is a perspective view of a hanging connector of FIG. 1 according to approaches of the disclosure.

Referring now to FIGS. 1-2, a sprinkler assembly/system, which may be a dry-type fire suppression sprinkler assembly, will be described in greater detail according to embodiments of the disclosure. As shown, the sprinkler assembly 100 may include a connector (e.g., a t-joint connector) 104, joining together a sprinkler body 106 with a first flexible conduit 110. The sprinkler assembly 100 may further include an adjustable bracket 112 coupling the sprinkler body 106 to a ceiling 116, which is shown partially cutaway for ease of viewing. A thermally responsive sprinkler head 120 extends downward from the sprinkler body 106, through an opening 122 in the ceiling 116, and into an environment 124 to be protected, which may be a living/work space, or cooler/freezer. In other embodiments, the sprinkler head 120 may be formed through a wall instead of through the ceiling.

In some embodiments, the sprinkler body 106 may be a dry-type pendent sprinkler body that acts as a conduit for a fire suppressant. In the event of a fire, a thermally responsive device 126 of the sprinkler head 120 reacts to heat generated by the fire to allow fluid to flow through the sprinkler body 106 and into a deflector 127, where the fluid is dispersed outwardly to extinguish the fire. Although a fluid commonly used in such dry sprinklers is water, other fire retardant fluids including nitrogen and halogen, may also be used in various embodiments.

As shown, the sprinkler body 106 is positioned to extend through the opening 122 in the ceiling 116. In the case that the environment 124 is a freezer, the ceiling 116 may include an outer wall 128 (e.g., a metal plate), an inner wall 130, and a layer of insulation 132 disposed between the inner and outer walls 130, 128. The sprinkler body 106 is positioned through the opening 122 such that the sprinkler head 120 is positioned within environment 124, which is cold and/or below freezing. In some embodiments, the sprinkler body 106 may include a sleeve 134 disposed along a lower portion thereof, and an escutcheon 138 surrounding the sprinkler head 120. As shown, a lower portion of the sleeve 134 extends from the opening 122 and is engaged by the escutcheon 138.

The connector 104 according to one non-limiting embodiment is a right-angled joint, e.g., making the shape of the letter 'T'. In embodiments, the sprinkler body 106 and the first flexible conduit 110 are secured directly to the connector 104. As configured, the sprinkler body 106 and the flexible conduit 110 are oriented perpendicular, or substantially perpendicular, to one another.

In some embodiments, the sprinkler body 106 is secured to the ceiling 116 by the adjustable bracket 112 using, for example, a set of fasteners 140A-B extending through the inner wall 130 and into the layer of insulation 132. Although non-limiting, the adjustable bracket 112 may be a hub assembly including a primary support 150 including a set of laterally extending tabs 152A-B, which mount to the inner wall 130 via the set of fasteners 140A-B, and a secondary support 156 that is rotatably connected to the primary support 150. The secondary support 156 rotates relative to the primary support 150 about a pin between an open position (not shown) and a closed position (shown). The primary support 150 and secondary support 156 are each formed having cut out portions, so that when the secondary support 156 is in the closed position relative to the primary support 150, the cut out formed in the primary support 150 cooperates with the cut out formed in the secondary support 156 to define a hub opening configured to receive and securely retain the sprinkler body 106 therein. When the adjustable bracket 112 is secured to the ceiling 116, the hub opening coincides with the opening 122 through the ceiling 116. In addition, the adjustable bracket 112 may include a locking mechanism 164 that selectively connects the primary support 150 to the secondary support 156, while an adjustable set screw (not shown) provided on the primary support 150 is used to secure the position of the sprinkler body 106 within the hub opening.

The sprinkler assembly 100 is configured to be mounted in a suspended manner from an overhead building support structure 115 via suitable hanger elements, such as for example, a hanging connector 125 connected to the support structure 115 by one or more metallic connectors 135, such as wires, cables, rods, struts, etc. As shown, the hanging connector 125 joins together the first flexible conduit 110 with a second flexible conduit 145. In some embodiments, the first and second flexible conduits 110, 145 are arranged linearly end-to-end such that the first and second flexible conduits 110, 145 are perpendicular, or substantially perpendicular, to the sprinkler body 106.

The first and second flexible conduits 110, 145 may include a flexible portion that comprises, for example, a corrugated tube, a hose, or a braided tube, which can be made from known materials including metal, rubber, etc. In an embodiment, the first and second flexible conduits 110, 145 may be corrugated metal with a braided metal covering, which is joined to respective mounting cuffs 111, 144 by welding or screw connectors. The first and second flexible conduits 110, 145 may be flexible along an entire length, or may include one or more flexible portions adjacent more rigid portions. In one non-limiting embodiment, the first and second flexible conduits 110, 145 may have a low elasticity so that when bent into a desired position, each conduit maintains its shape and does not return to an original position/shape.

Figure 3:
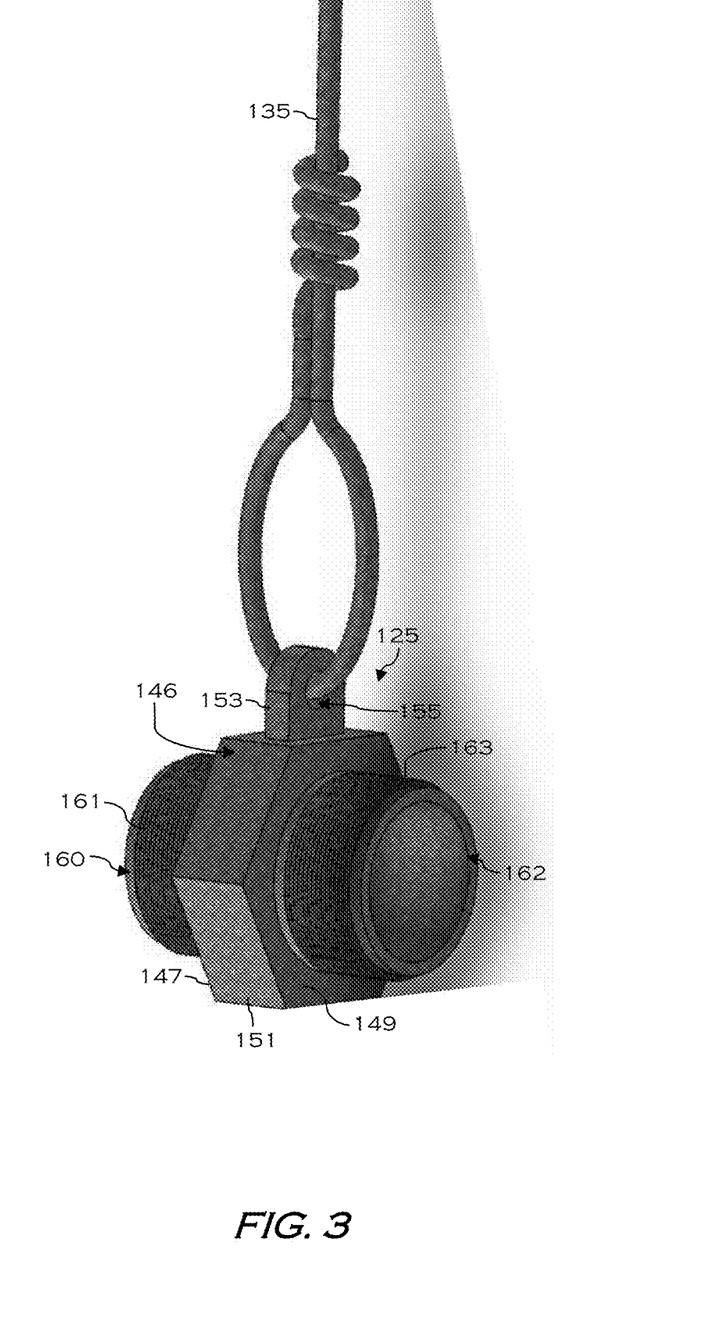
FIG. 3 is a perspective view of a hanging connector according to approaches of the disclosure.

In some embodiments, the hanging connector 125 includes a body 146 including a first side 147 opposite a second side 149, the first and second sides 147, 149 separated by a sidewall 151. The hanging connector 125 may include a first connection arm 160 (FIG. 3) extending from the first side 147 and a second connection arm 162 (FIG. 3) extending from the second side 149. Each of the first and second connection arms 160, 162 is threaded to engage corresponding threading of the first and second flexible conduits 110, 145. For example, as shown, the first and second connection arms 160 and 162 may include exterior threading 161 and 163, respectively. The mounting cuffs 111, 144 and/or the first and second flexible conduits 110, 145 may include corresponding interior threading (not shown). In other embodiments, the first and second connection arms 160 and 162 may include interior threading, while the mounting cuffs 111, 144 and/or the first and second flexible conduits 110, 145 may include exterior threading.

The hanging connector further includes a hanging member 153 extending outwardly from the sidewall 151, wherein the hanging member 153 may be an eye loop having an opening 155 formed therein. The metallic connector 135 may be looped through the opening 155 of the hanging member 153, and coupled at an opposite end to the support structure 115. In some embodiments, the metallic connector 135 is a wire or coil. In some embodiments, the body 146 has a hexagonal shape (e.g., viewed from side). However, the body 146 may be different shapes in other embodiments.

Figure 4:
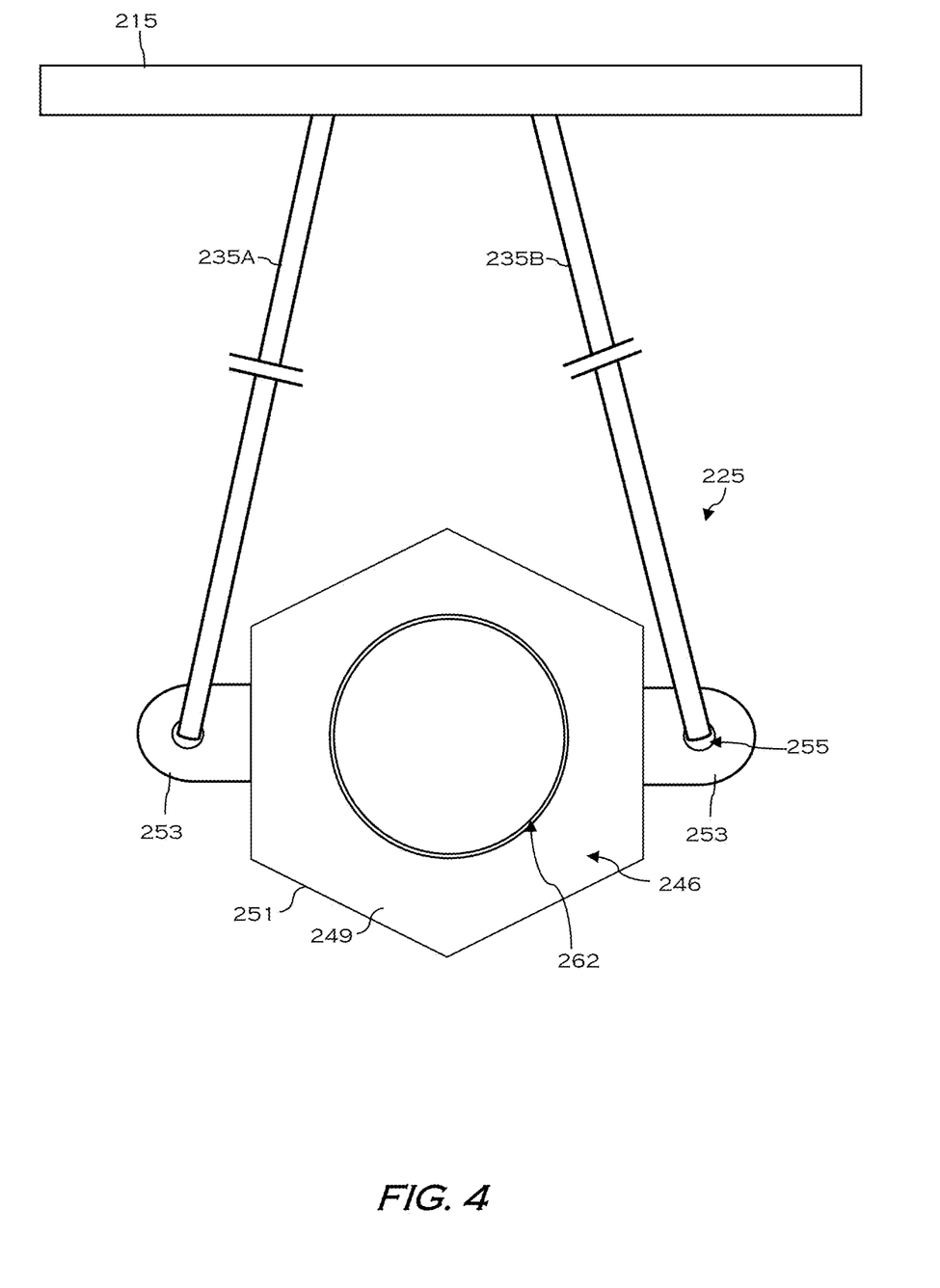
FIG. 4 is an end view of a hanging connector according to approaches of the disclosure.

Turning now to FIG. 4, a hanging connector 225 according to other embodiments of the disclosure will be described in greater detail. In some embodiments, the hanging connector 225 includes a body 246 including a first side (not shown) opposite a second side 249, the first and second sides separated by a sidewall 251. The hanging connector 225 may include a first connection arm (not shown)) extending from the first side and a second connection arm 262 extending from the second side 249. Each of the first and second connection arms is threaded to engage corresponding threading of the first and second flexible conduits (not shown).

The hanging connector 225 further includes a pair of hanging members 253 extending outwardly from opposite portions of the sidewall 251. In some embodiments, each of the hanging members 253 may be an eye loop having an opening 255 formed therein. As shown, the hanging members 253 extend outwardly at an angle parallel to the support structure 215. In some embodiments, one of the hanging members 253 is connected to the support structure 215, which is located above the hanging connector 225, while another of the hanging members 253 extends to a structural wall that is perpendicular to the support structure 215. The hanging connector 225 further includes a pair of metallic connectors 235A-B, which may be looped through the opening 255 of each hanging member 253. The metallic connectors 235A-B may each be a wire or coil coupled to the support structure 215 for suspending the hanging connector 225.

Figure 5:
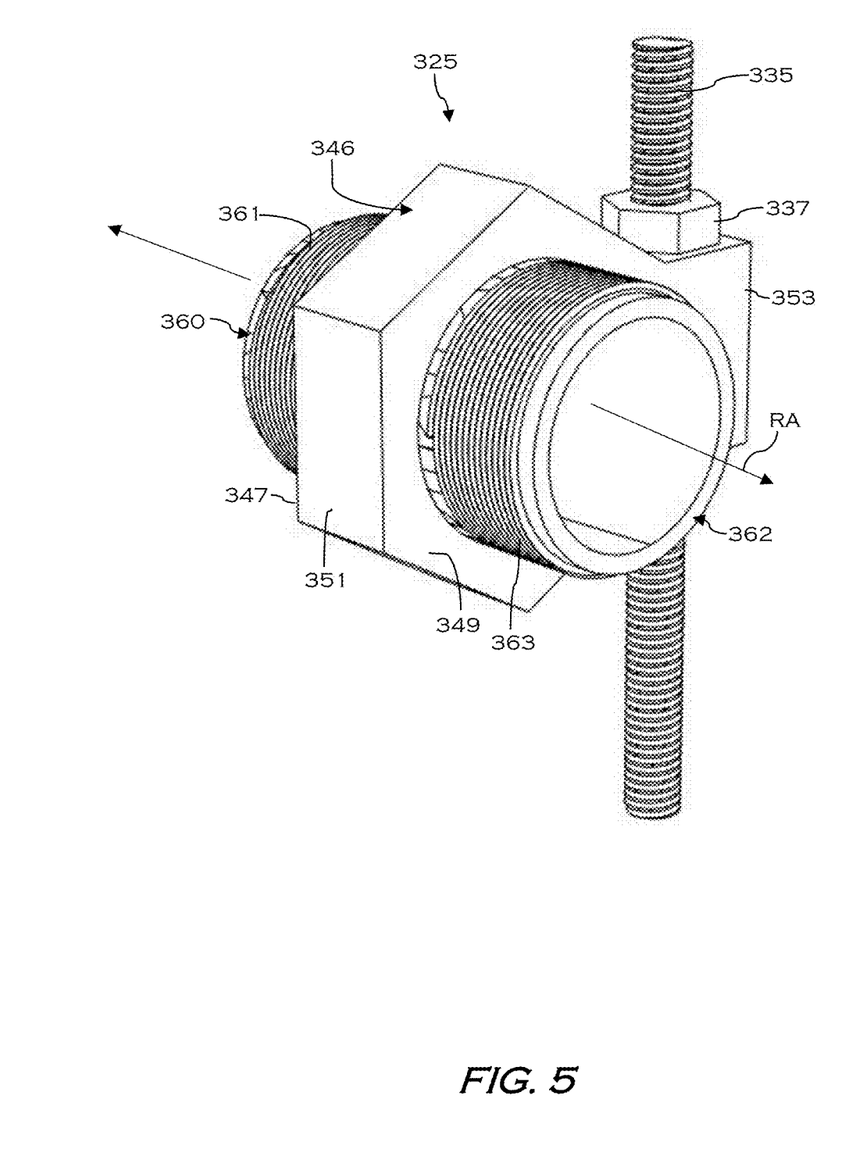
FIG. 5 is a perspective view of a hanging connector according to approaches of the disclosure.

Turning now to FIG. 5, a hanging connector 325 according to other embodiments of the disclosure will be described in greater detail. As shown, the hanging connector 325 includes a body 346 including a first side 347 opposite a second side 349, the first and second sides 347, 349 separated by a sidewall 351 extending therebetween. The hanging connector 325 may include a first connection arm 360 extending from the first side 347 and a second connection arm 362 extending from the second side 349. Each of the first and second connection arms 360, 362 has threading 361, 363 to engage corresponding threading of the first and second flexible conduits (not shown).

The hanging connector 325 further includes a hanging member 353 extending outwardly from the sidewall 351. In some embodiments, the hanging member 353 may be rectangular block having an opening formed therein for receipt of a metallic connector 335, which may be a rod. The metallic connector 335 may be secured within the opening of the hanging member 353 by one or more washers 337. As shown, the metallic connector 335, which is coupled to a support structure located above (not shown), is oriented perpendicular, or substantially perpendicular, to a length wise axis 'RA' extending through the center of the first and second connection arms 360, 362.

Figure 6:
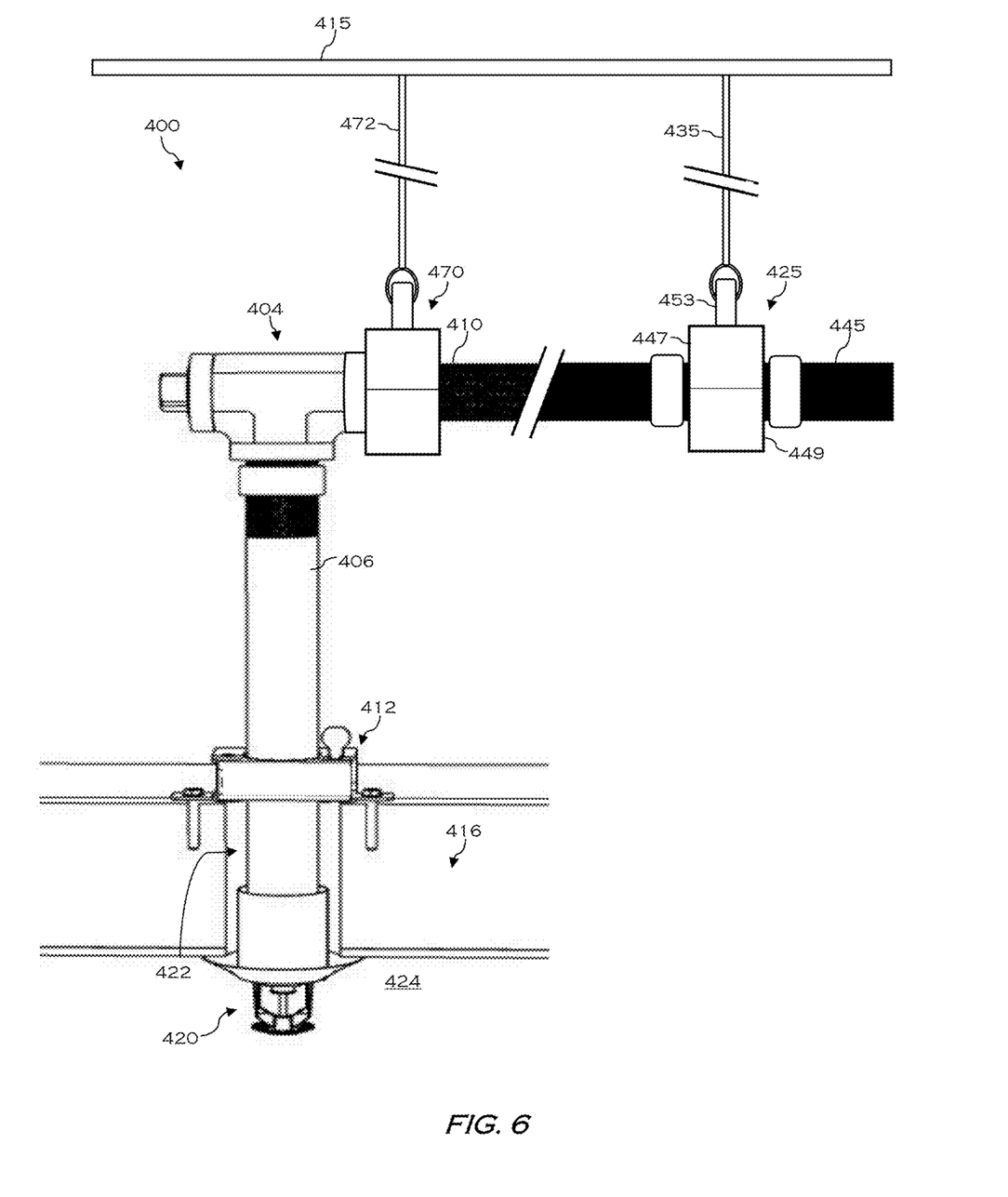
FIG. 6 is an isometric side view of a sprinkler assembly according to approaches of the disclosure.

Turning now to FIG. 6, a sprinkler assembly 400 according to other embodiments of the disclosure will be described in greater detail. The sprinkler assembly 400 includes many or all of the features previously described in relation to the sprinkler assembly 100 and hanging connector 125 of FIGS. 1-3. As such, only certain aspects of the sprinkler assembly 400 will hereinafter be described for the sake of brevity.

As shown, the sprinkler assembly 400 may include a connector (e.g., a t-joint connector) 404, indirectly joining together a sprinkler body 406 with a first flexible conduit 410. The sprinkler assembly 400 may further include an adjustable bracket 412 coupling the sprinkler body 406 to a ceiling 416, which is shown partially cutaway for ease of viewing. A thermally responsive sprinkler head 420 extends downward from the sprinkler body 406, through an opening 422 in the ceiling 416, and into an environment 424 to be protected, which may be a living/work space, or cooler/freezer.

The sprinkler assembly 400 is configured to be mounted in a suspended manner from an overhead building support structure 415 via suitable hanger elements, such as for example, a first hanging connector 425 having a first side 447 opposite a second side 449, wherein the first hanging connector is connected to the support structure 415 by the hanging member 453 and by one or more metallic connectors 435, such as wires, cables, rods, struts, etc. As shown, the first hanging connector 425 joins together the first flexible conduit 410 with a second flexible conduit 445. In some embodiments, the first and second flexible conduits 410, 445 are arranged linearly end-to-end such that the first and second flexible conduits 410, 445 are perpendicular, or substantially perpendicular, to the sprinkler body 406.

The connector 404 according to a non-limiting embodiment is a right-angled joint, e.g., making the shape of the letter 'T'. In embodiments, the sprinkler body 406 is secured directly to the connector 404. Furthermore, the connector 404 may be secured directly to a second hanging connector 470, which is connected to the support structure 415 by one or more metallic connectors 472, such as wires, cables, rods, struts, etc. As shown, the second hanging connector 470 may be directed connected on one side to the first flexible conduit 410 (e.g., by a mounting cuff with threaded connection), and on another side to the connector 404 (e.g., by a mounting cuff with threaded connection). The second hanging connector 470 may be directly physically coupled to the connector 404, or connected by one or more intermediate components. In yet other embodiments, a third hanging connector (not shown) may be directly connected at an opposite side of the connector 404.

Figure 7A:
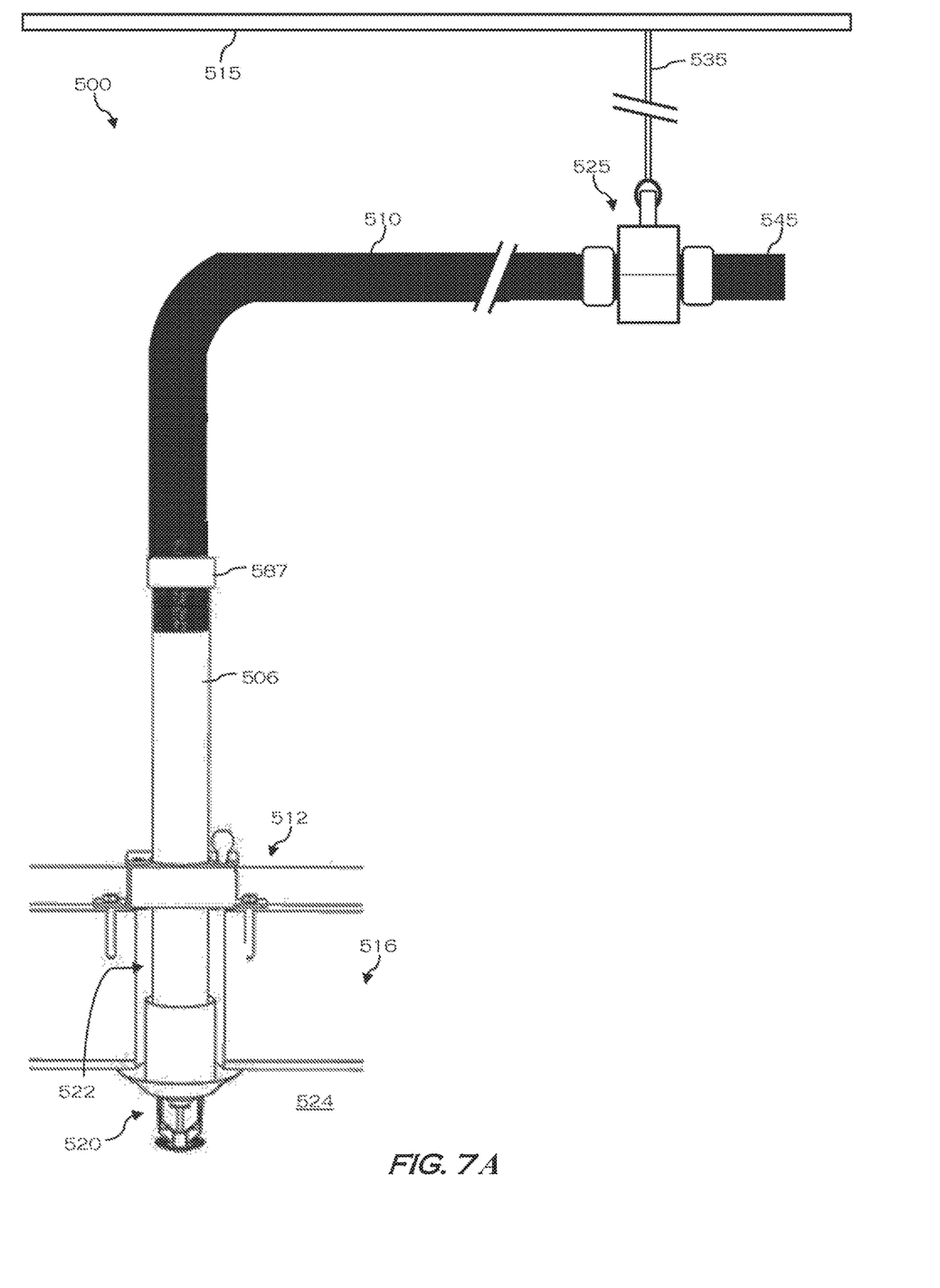
FIG. 7A is an isometric side view of a sprinkler assembly according to approaches of the disclosure.
Figure 7B:
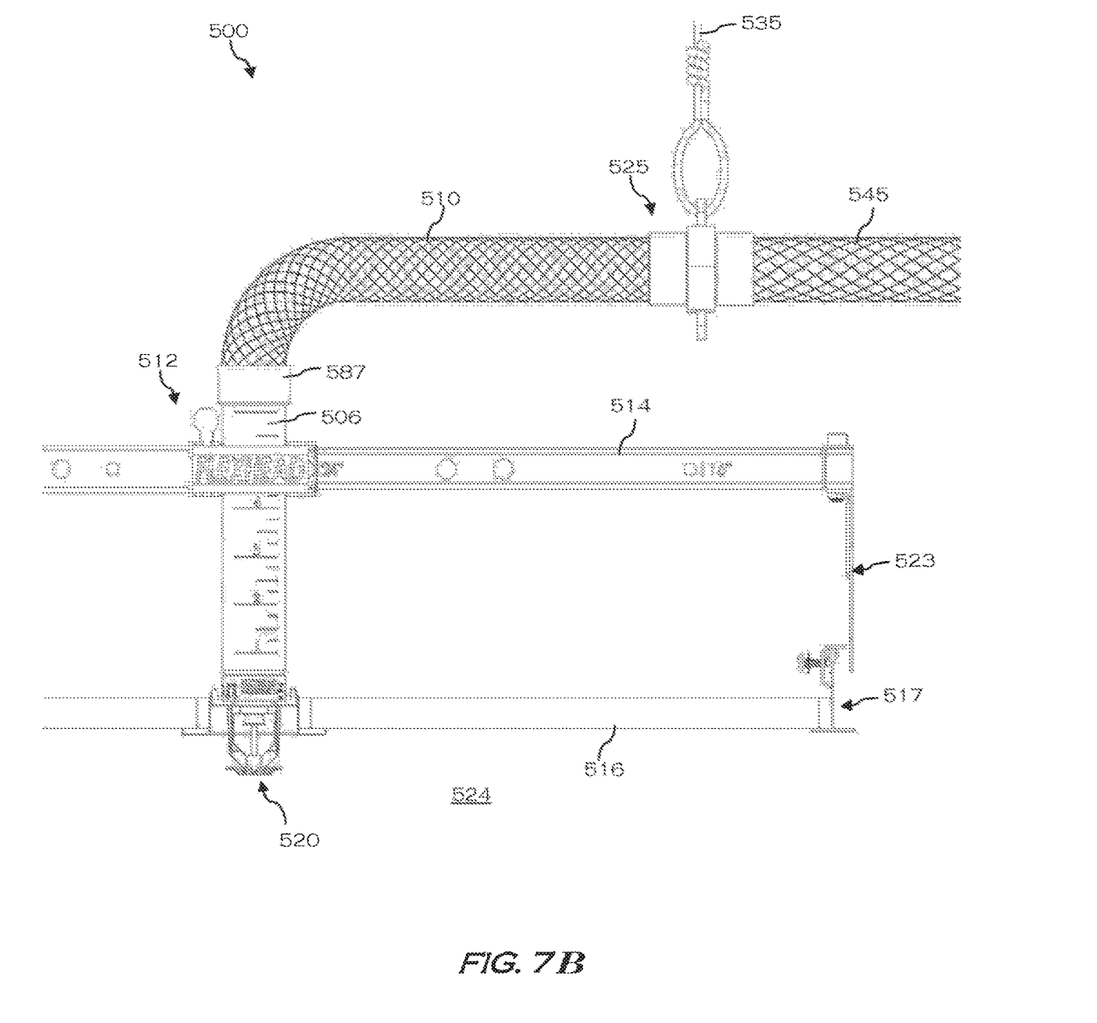
FIG. 7B is an isometric side view of a variation of the sprinkler assembly of FIG. 7A according to approaches of the disclosure.

Turning now to FIGS. 7A and 7B, variations of a sprinkler assembly according to other embodiments of the disclosure will be described in greater detail. The sprinkler assembly 500 includes many or all of the features previously described above in relation to the sprinkler assemblies 100 and 400, and hanging connectors 125, 425, and 425. As such, only certain aspects of the sprinkler assembly 500 will hereinafter be described for the sake of brevity.

In the embodiment shown, the sprinkler assembly 500 may include a sprinkler body 506 (e.g., sprinkler drop) directly connected with a first flexible conduit 510, for example, via mounting cuff 587. In other words, no connector may be present in this embodiment. The sprinkler assembly 500 may further include an adjustable hub or bracket 512 coupling the sprinkler body 506 to a bracket bar 514, which in turn is coupled to one or more beams 517 by a support assembly 523. In one embodiment, each of the beams 517 may be a t-shaped beam. A thermally responsive sprinkler head 520 extends downward from the sprinkler body 506, through an opening 522 in the ceiling 516, and into an environment 524 to be protected.

The sprinkler assembly 500 is configured to be mounted in a suspended manner from an overhead building support structure (not shown) via suitable hanger elements, such as for example, a hanging connector 525 connected to the support structure 515 by one or more metallic connectors 535, such as wires, cables, rods, struts, etc. As shown, the hanging connector 525 joins together the first flexible conduit 510 with a second flexible conduit 545. In some embodiments, the first and second flexible conduits 510, 545 are arranged linearly end-to-end such that the second flexible conduit 545 is perpendicular, or substantially perpendicular, to the sprinkler body 506.

One will appreciate that at least the following advantages are achieved by the embodiments of the present disclosure. Firstly, use of the hanger connector at regular intervals satisfies certain fire code standards related to flexible metal conduits used in fire suppression systems. The hanger connectors can be affixed to a ceiling support structure, as desired, and the flexible conduits can then be secured thereto during installation. Secondly, the hanging connector allows two flexible conduits to be reliably secured together end-to-end using a pair of opposed connection arms extending from the body of the hanging connector.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A sprinkler assembly comprising:
   a sprinkler body coupled to a first end of a first flexible conduit, the first flexible conduit defining a second end disposed opposite from the first end;
   a hanging connector coupled to the second end of the first flexible conduit and to a second flexible conduit, a lengthwise axis extending through the hanging connector from the first flexible conduit to the second flexible conduit, the hanging connector including a hanging member extending outwardly from the hanging connector, the hanging member being fixed relative to the hanging connector, the hanging member defining an eye loop extending completely through the hanging member from a first surface of the hanging member to a second surface of the hanging member, the first surface defined opposite from the second surface, the eye loop defining an eye loop axis extending from the first surface to the second surface, the lengthwise axis oriented substantially parallel to the eye loop axis; and
   a metallic connector extending between the hanging member and a support structure.

2. The sprinkler assembly of claim 1, wherein the metallic connector extends through an opening of the eye loop.

3. The sprinkler assembly of claim 2, wherein the metallic connector extends completely through the eye loop from the first surface to the second surface.

4. The sprinkler assembly of claim 1, wherein the metallic connector is one of: a wire, a coil, or a rod.

5. The sprinkler assembly of claim 1, further comprising:
   a second hanging member extending outwardly from the hanging connector; and
   a second metallic connector extending between the second hanging member and the support structure.

6. The sprinkler assembly of claim 5, wherein:
   the hanging member and the second hanging member extend radially outward from the hanging connector relative to the lengthwise axis; and
   the hanging member is positioned opposite from the second hanging member.

7. The sprinkler assembly of claim 1, wherein the first flexible conduit and the second flexible conduit are coupled together end-to-end by the hanging connector.

8. The sprinkler assembly of claim 1, wherein the lengthwise axis extends through the hanging connector from a first connection arm of the hanging connector to a second connection arm of the hanging connector;
   the first connection arm is coupled to the first flexible conduit; and
   the second connection arm is coupled to the second flexible conduit.

9. The sprinkler assembly of claim 1, wherein the first flexible conduit, the hanging connector, and the second flexible conduit are at least partially filled with fire retardant fluid.

10. The sprinkler assembly of claim 1, wherein the hanging connector is operably coupled to the first flexible conduit and the second flexible conduit.

11. A hanging connector comprising:
   a body including a first side opposite a second side, the body defining a hexagonal shape comprising six flat sides; and
   a first connection arm extending from the first side and a second connection arm extending from the second side, the first side and the second side separated by a sidewall, a lengthwise axis extending through the hanging connector from the first connection arm to the second connection arm; and
   a hanging member extending outwardly from the sidewall, the hanging member being fixed relative to the sidewall, the hanging member positioned perpendicular to a first flat side of the six flat sides, the hanging member defining an eye loop extending completely through the hanging member from a first surface of the hanging member to a second surface of the hanging member, the first surface defined opposite from the second surface, the eye loop defining an eye loop axis extending from the first surface to the second surface, the lengthwise axis oriented substantially parallel to the eye loop axis.

12. The hanging connector of claim 11, further comprising a metallic connector extending between the hanging member and a support structure, the metallic connector extending through an opening of the eye loop.

13. The hanging connector of claim 12, wherein the metallic connector is one of: a wire, a coil, or a rod.

14. The hanging connector of claim 12, further comprising:
a second hanging member extending outwardly from the body; and
a second metallic connector extending between the second hanging member and the support structure.

15. The hanging connector of claim 12, wherein the metallic connector extends completely through the eye loop from the first surface to the second surface.

16. The hanging connector of claim 15, wherein the metallic connector is looped around at least a portion of the hanging member.

17. The hanging connector of claim 14, wherein:
the hanging member and the second hanging member extend radially outward from the sidewall relative to the lengthwise axis; and
the hanging member is positioned opposite from the second hanging member.

18. The hanging connector of claim 17, wherein:
the hanging member and the second hanging member are horizontally oriented;
the metallic connector extends upwards from the hanging member to the support structure; and
the second metallic connector extend upwards from the second hanging member to the support structure.

19. The hanging connector of claim 11, wherein the first connection arm includes threading for connection with a first flexible conduit, and wherein the second connection arm includes threading for connection with a second flexible conduit.

20. A sprinkler assembly comprising:
a sprinkler body coupled at one end to a sprinkler head and at another end to a first end of a first flexible conduit, the first flexible conduit defining a second end opposite from the first end;
a hanging connector coupled to the second end of the first flexible conduit and to a second flexible conduit, the hanging connector comprising:
a first side, a second side opposite the first side, and a sidewall extending between the first and second sides;
a hanging member extending outwardly from the sidewall, the hanging member being fixed relative to the sidewall, the hanging member defining an eye loop extending completely through the hanging member from a first surface of the hanging member to a second surface of the hanging member, the first surface defined opposite from the second surface, the eye loop defining an eye loop axis extending from the first surface to the second surface; and
a first threaded connection arm extending from the first side and a second threaded connection arm extending from the second side, wherein the second end of the first flexible conduit is secured to the first threaded connection arm and the second flexible conduit is secured to the second threaded connection arm; and
a flexible metallic connector extending between the hanging member and a support structure, a lengthwise axis extending through the hanging connector from the first threaded connection arm to the second threaded connection arm; the lengthwise axis oriented substantially parallel to the eye loop axis.

21. The sprinkler assembly of claim 20, wherein the flexible metallic connector extends through an opening of the eye loop.

22. The sprinkler assembly of claim 20, wherein the first and second flexible conduits are arranged linearly end-to-end, and wherein the first and second flexible conduits are substantially perpendicular to the sprinkler body.

23. The sprinkler assembly of claim 20, wherein the first flexible conduit, the hanging connector, and the second flexible conduit are at least partially filled with fire retardant fluid.

24. The sprinkler assembly of claim 20, wherein the hanging connector is operably coupled to the first flexible conduit and the second flexible conduit.

* * * * *